US009497496B1

(12) United States Patent
Corley et al.

(10) Patent No.: US 9,497,496 B1
(45) Date of Patent: Nov. 15, 2016

(54) PERSONALIZED CONTENT INSERTION INTO MEDIA ASSETS AT THE NETWORK EDGE

(75) Inventors: Jonathan B. Corley, Seattle, WA (US); Tal Saraf, Seattle, WA (US); Bradley E. Marshall, Bainbridge Island, WA (US)

(73) Assignee: Amazon Technologies, Inc., Reno, NV (US)

(*) Notice: Subject to any disclaimer, the term of this patent is extended or adjusted under 35 U.S.C. 154(b) by 207 days.

(21) Appl. No.: 13/466,002

(22) Filed: May 7, 2012

(51) Int. Cl.
| | | |
|---|---|---|
| *H04N 7/10* | (2006.01) | |
| *G06Q 30/00* | (2012.01) | |
| *H04N 21/258* | (2011.01) | |
| *H04L 29/06* | (2006.01) | |
| *G06Q 30/02* | (2012.01) | |
| *H04N 7/025* | (2006.01) | |
| *H04N 7/173* | (2011.01) | |
| *G06F 15/16* | (2006.01) | |

(Continued)

(52) U.S. Cl.
CPC ........ *H04N 21/258* (2013.01); *G06Q 30/0251* (2013.01); *G06Q 30/0255* (2013.01); *G06Q 30/0261* (2013.01); *G06Q 30/0269* (2013.01); *G06Q 30/0271* (2013.01); *H04L 29/06095* (2013.01); *H04N 21/25883* (2013.01)

(58) Field of Classification Search
CPC ............. G06Q 30/0269; G06Q 30/0255; G06Q 30/0251; G06Q 30/0224; G06Q 30/0261; G06Q 30/0271; H04N 21/25883; H04N 21/812; H04N 21/25891; H04N 21/23424; H04N 21/44016; H04N 21/4532; H04N 21/25841; H04N 21/2668; H04N 21/2223; H04N 21/2225; H04N 21/00; H04N 21/647; H04N 21/64738; H04N 21/222; H04N 21/242; H04N 7/52; H04H 20/10; G06T 2207/20021; H04L 67/1002; H04L 65/00; H04L 29/06095
USPC ........ 709/219, 231; 725/32, 119, 34, 35, 36; 711/122; 370/466, 503; 375/240.38, 375/240.82; 705/14.49, 14.53, 14.58, 705/14.66, 14.67
See application file for complete search history.

(56) References Cited

U.S. PATENT DOCUMENTS

| | | |
|---|---|---|
| 5,541,852 A | 7/1996 | Eyuboglu et al. |
| 6,732,332 B1 | 5/2004 | Borysewicz et al. |

(Continued)

OTHER PUBLICATIONS

Non-Final Office Action issued in U.S. Appl. No. 13/465,944 dated Sep. 24, 2014, 23 pages.

(Continued)

*Primary Examiner* — Hoang-Vu A Nguyen-Ba
(74) *Attorney, Agent, or Firm* — Hogan Lovells US LLP

(57) ABSTRACT

Techniques for inserting advertising content and other personalized information into media assets are described. The techniques involve inserting personalized ads and other content into media assets as a server at the content delivery network (CDN) point-of-presence (POP) is performing the individualized encoding of the file on-the-fly. The ads and other content can be personalized based on the user's purchasing habits, user's location (geographic, GPS, IP location, etc.), the content in the media file and the like. In addition, the ads can be inserted into specific parts of the video (i.e. key frames, key slices, etc.) because the CDN node is actually transcoding the content and thus can insert the ads into the content in its own native format. For example, ads can appear as part of the video itself, different language subtitles can be integrated into the video based on the location of the user, and the like.

22 Claims, 6 Drawing Sheets

(51) Int. Cl.
*H04J 3/16* (2006.01)
*H04J 3/06* (2006.01)
*H04N 7/12* (2006.01)

(56) References Cited

U.S. PATENT DOCUMENTS

| | | | |
|---|---|---|---|
| 7,231,023 | B1 | 6/2007 | Begeja |
| 7,761,900 | B2* | 7/2010 | Crayford ............... 725/87 |
| 7,958,532 | B2 | 6/2011 | Paul et al. |
| 8,634,705 | B2 | 1/2014 | Yogeshwar et al. |
| 9,078,091 | B2 | 7/2015 | Lehtiniemi et al. |
| 9,088,634 | B1 | 7/2015 | Corley |
| 9,183,049 | B1 | 11/2015 | Corley |
| 9,189,484 | B1 | 11/2015 | Velummylum |
| 9,223,621 | B1 | 12/2015 | Corley |
| 9,292,896 | B1 | 3/2016 | Corley |
| 2002/0150247 | A1 | 10/2002 | Linnartz et al. |
| 2002/0170035 | A1 | 11/2002 | Casati et al. |
| 2006/0168630 | A1* | 7/2006 | Davies ............... 725/89 |
| 2007/0002946 | A1 | 1/2007 | Bouton et al. |
| 2007/0106622 | A1 | 5/2007 | Boomershine |
| 2007/0157260 | A1* | 7/2007 | Walker ............... 725/86 |
| 2007/0162945 | A1* | 7/2007 | Mills ............... 725/119 |
| 2007/0174338 | A1 | 7/2007 | Liggett |
| 2008/0034393 | A1* | 2/2008 | Crayford ............... 725/87 |
| 2008/0146160 | A1 | 6/2008 | Jiang et al. |
| 2008/0205510 | A1 | 8/2008 | Komi et al. |
| 2008/0301588 | A1 | 12/2008 | Kumar et al. |
| 2009/0083279 | A1 | 3/2009 | Hasek |
| 2009/0254672 | A1 | 10/2009 | Zhang |
| 2009/0276266 | A1 | 11/2009 | Nishiyama |
| 2009/0276716 | A1 | 11/2009 | Chua |
| 2010/0054148 | A1 | 3/2010 | Murakami et al. |
| 2010/0054327 | A1 | 3/2010 | Capless |
| 2010/0076805 | A1 | 3/2010 | Batsakis et al. |
| 2010/0088505 | A1 | 4/2010 | Coppola et al. |
| 2010/0131674 | A1 | 5/2010 | Vecchio |
| 2010/0195540 | A1 | 8/2010 | Kerr et al. |
| 2010/0199299 | A1* | 8/2010 | Chang et al. ............... 725/32 |
| 2010/0205616 | A1 | 8/2010 | Lai et al. |
| 2010/0250710 | A1* | 9/2010 | Cadwell et al. ............... 709/219 |
| 2010/0281042 | A1 | 11/2010 | Windes et al. |
| 2010/0309794 | A1* | 12/2010 | Keynan et al. ............... 370/252 |
| 2010/0332262 | A1 | 12/2010 | Horvitz et al. |
| 2011/0019870 | A1 | 1/2011 | Ballocca et al. |
| 2011/0082982 | A1* | 4/2011 | Harvell et al. ............... 711/122 |
| 2011/0153628 | A1 | 6/2011 | Basu et al. |
| 2011/0197221 | A1* | 8/2011 | Rouse et al. ............... 725/32 |
| 2011/0209162 | A1 | 8/2011 | Machiraju et al. |
| 2011/0313982 | A1 | 12/2011 | Kranendonk et al. |
| 2012/0072542 | A1 | 3/2012 | McGowan |
| 2012/0089687 | A1 | 4/2012 | Katz |
| 2012/0102154 | A1 | 4/2012 | Huang et al. |
| 2012/0158645 | A1 | 6/2012 | Shafiee et al. |
| 2012/0159494 | A1 | 6/2012 | Shafiee et al. |
| 2012/0159503 | A1 | 6/2012 | Shafiee et al. |
| 2012/0192239 | A1 | 7/2012 | Harwell et al. |
| 2012/0278441 | A1 | 11/2012 | Li et al. |
| 2013/0019311 | A1* | 1/2013 | Swildens et al. ............... 726/23 |

OTHER PUBLICATIONS

Final Office Action issued in U.S. Appl. No. 13/465,975 dated Sep. 11, 2014, 48 pages.
Non-Final Office Action issued in U.S. Appl. No. 13/465,975 dated Feb. 4, 2014, 32 pages.
Final Office Action issued in U.S. Appl. No. 13/465,978 dated Jul. 3, 2014, 26 pages.
Non-Final Office Action issued in U.S. Appl. No. 13/465,978 dated Feb. 4, 2014, 23 pages.
Non-Final Office Action issued in U.S. Appl. No. 13/465,987 dated Apr. 2, 2013, 9 pages.
Non-Final Office Action issued in U.S. Appl. No. 13/465,992 dated Jul. 29, 2014, 32 pages.
Non-Final Office Action issued in U.S. Appl. No. 13/465,997 dated May 1, 2014, 12 pages.
Non-Final Office Action issued in U.S. Appl. No. 13/465,997 dated Oct. 21, 2014, 14 pages.
"Final Office Action dated Oct. 24, 2013", U.S. Appl. No. 13/465,987.
Newtown, , "API", Newton's Telecom Dictionary, 18th Ed., Feb. 2002, 1 page.
"Notice of Allowance dated Mar. 27, 2015" received in U.S. Appl. No. 13/465,931.
"Non Final Office Action dated Jul. 31, 2015" received in U.S. Appl. No. 13/465,944.
"Final Office Action dated Mar. 21, 2016" received in U.S. Appl. No. 13/465,944.
"Non Final Office Action dated Oct. 22, 2015" received in U.S. Appl. No. 13/465,960.
"Final Office Action dated Sep. 8, 2015" received in U.S. Appl. No. 13/465,975.
"Final Office Action dated Aug. 27, 2015" received in U.S. Appl. No. 13/465,978.
"Non Final Office Action dated Jul. 17, 2015" received in U.S. Appl. No. 13/465,987.
"Non Final Office Action dated Jul. 14, 2015" received in U.S. Appl. No. 13/465,992.
"Notice of Allowance dated Mar. 8, 2016" received in U.S. Appl. No. 13/465,992.
"Software." The Authoritative Dictionary of IEEE Standard Terms. 7$^{th}$ ed. 2000, pp. 1067.
"Non Final Office Action dated Jun. 5, 2015" received in U.S. Appl. No. 14/682,004.
"Notice of Allowance dated Nov. 20, 2015" received in U.S. Appl. No. 14/682,004.

* cited by examiner

PERSONALIZED CONTENT INSERTION INTO MEDIA ASSETS AT THE NETWORK EDGE

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Transcoding is the decoding and recoding of digital content from one format to another. Transcoding is often necessary to enable playback of media on different devices. It can be used to convert a digital audio, video file, and video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported.

A content delivery network (CDN) is an interconnected network of computer nodes that contain copies of various types of data. CDNs are used to deliver content to end users in a more efficient manner by bringing the data in closer proximity to the end user. Using a CDN can improve access to the data cached at the nodes by increasing access bandwidth/redundancy and reducing access latency. CDNs are often used to provide access to media content.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for inserting personalized content into media assets. In particular, the various embodiments provide approaches for inserting advertising and other content into media files at the network edge, at the time of providing the media to the requesting devices.

In accordance with various embodiments, techniques for inserting advertising content and other personalized information into media assets are described. The techniques involve inserting personalized ads and other content into the media file as the content delivery network (CDN) point-of-presence (POP) is performing the individualized encoding of the file on-the-fly. The ads and other content can be personalized based on the user's purchasing habits, user's location (geographic, GPS, IP location, etc.), the content in the media file and the like. In addition, the ads can be inserted into specific parts of the video (i.e. key frames, key slices, etc.) because a server at the POP is actually transcoding the content and thus can insert the ads into the content in its own native format. For example, ads can appear as part of the video itself, different language subtitles can be integrated into the video based on the location of the user, and the like.

Figure 1:
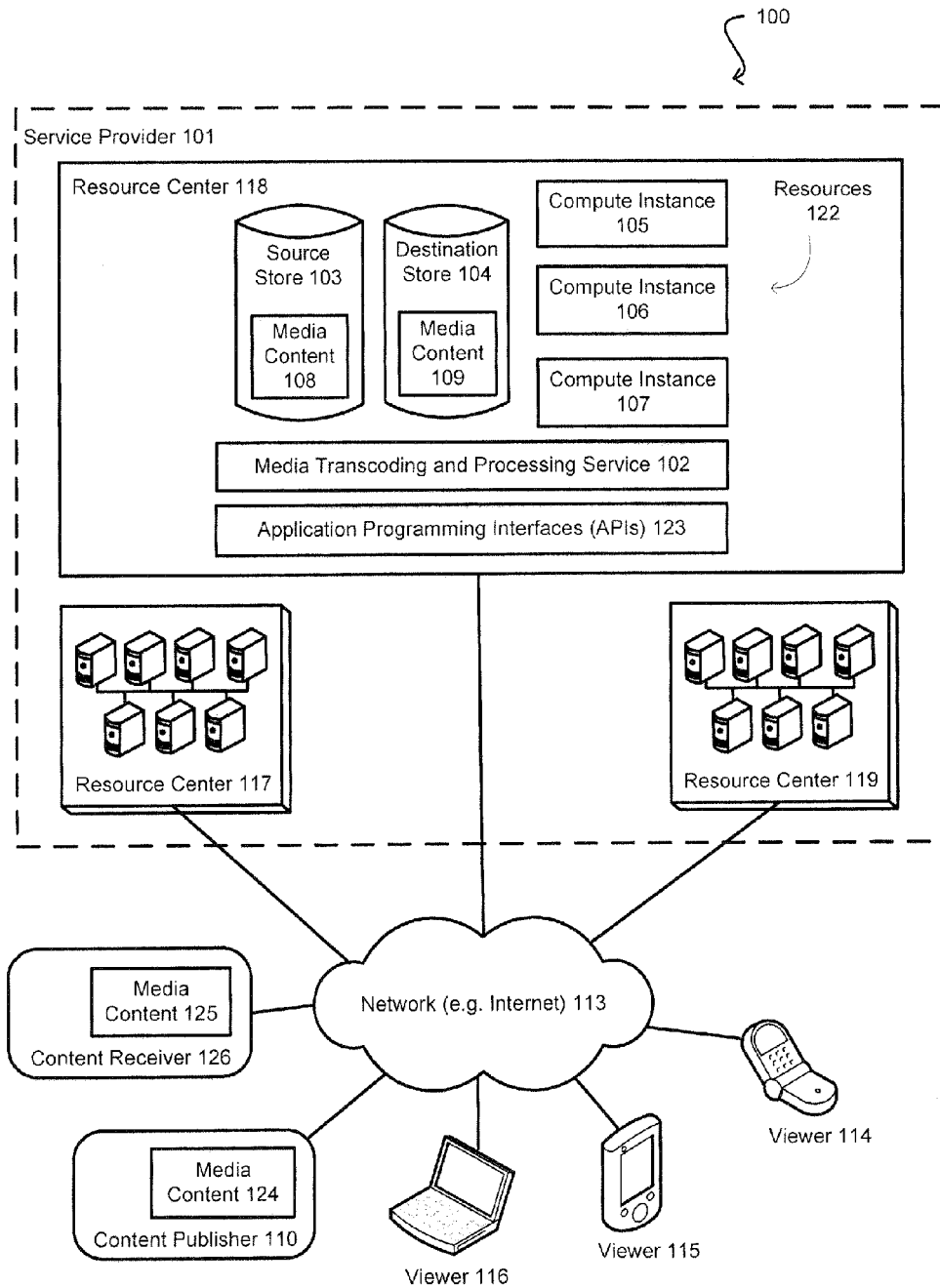
FIG. 1 is a general illustration of an environment in which the personalized content insertion and transcoding can be implemented, in accordance with various embodiments.

FIG. 1 is a general illustration of an environment 100 in which personalized content insertion and transcoding can be implemented, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANS), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other features of this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the transcoding service. As one option, the pricing of transcoding service could be based on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

As mentioned above, the transcoding service can be configured to accept media content in a wide variety of incoming formats and can convert the content into a comprehensive collection of output encodings, including various media formats and bitrates. The media transcoding and processing service could include an API, user portal, or graphical user interface (GUI) that includes locations (stores) for a content publisher to upload media files. The input store may include any storage, bucket, container, directory, memory location, or any other place where media can be located. In some embodiments, the input store could have a unique profile associated therewith for transcoding the media file to produce an output of the media file in various predefined media formats. There could be an input location for commonly used profiles and for combinations of commonly used profiles. Alternatively, the workflows and profiles can be selected and applied based on various attributes of the media file (e.g. file name, metadata, etc.) rather than being associated with the input store itself.

Figure 2:
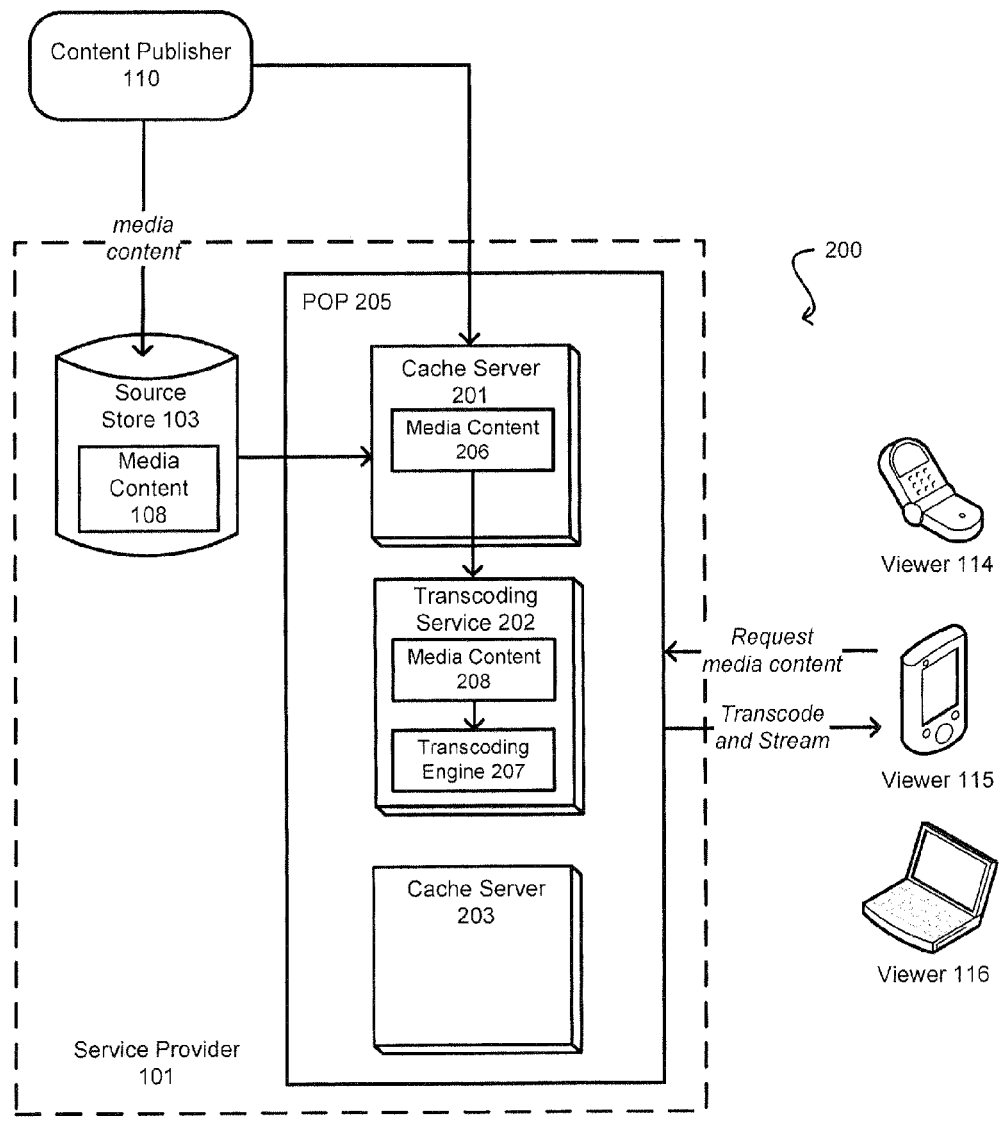
FIG. 2 is an example of a network edge environment where media content can be dynamically transcoded based at least in part upon on requesting device type, in accordance with various embodiments.

FIG. 2 is an example of a network edge environment 200 where media content can be dynamically transcoded based at least in part upon on requesting device type, in accordance with various embodiments. It should be understood that reference numbers for like components may be carried over between figures for purposes of explanation, but this should not be interpreted as limiting the scope of the various embodiments.

As previously described, a content publisher 110 can provide the media content 108 to the source store 103 or some other storage location provided by the service provider 101. The service provider can then transfer the media content to a cache server 201 (or another server) residing at the content delivery network (CDN) point of presence (POP) 205 in order to make access to it more efficient for users proximate to that POP. In an alternative embodiment, the content publisher 110 may provide the media content 108 directly to the POP 205 from a location on the content publisher 110. As previously mentioned, the CDN of the service provider may include a plurality of POPs (such as POP 205) which may be geographically distributed to various locations that are proximate to the end users and devices. Several POPs can use the same Internet protocol (IP) address and the routing scheme can be utilized that to find a POP that is the closest to an end user in terms of network hops required to reach it. It should be noted that while the source store 103 is shown as being located outside of POP 205 in FIG. 2, this is not intended to be a limitation to the various embodiments described herein. In some embodiments, the source store may be located at the same POP 205 and therefore may not need to be transferred. In other embodiments, the source store 103 may be located at another POP (or other resource center) and the transfer of the media content from the source store 103 to the POP 205 may occur in response to receiving the request for the media content at POP 205. Alternatively, the transfer of the media content from the source store 103 to POP 205 may be performed automatically upon placement of the media content into the source store.

In accordance with the illustrated embodiment, POP 205 can include a number of cache servers (201, 203) capable of storing a copy of the media content 206 locally to be made available to the various requesting devices. In addition, the POP 205 may include a transcoding service 202. When a viewer device (e.g. device 115) requests the media content from the POP 205, the request can be inspected to determine a device type (or application-type, OS-type, browser-type, etc.) associated with the requesting viewer based on information contained in the request. For example, based on the HTTP header information contained in the request, it may be determined that the device 115 requesting the media file is a mobile phone running the Apple® IOS operating system. In accordance with various embodiments, each device type can be associated with a particular type of encoding format that is suitable to display or render the media file on that device. In addition, a profile may be associated with the device type and may contain all of the processing settings and parameters necessary to transcode the media content into the format appropriate for the device.

In accordance with an embodiment, once the type of device requesting the content is identified, the POP 205 can make a determination whether the copy 206 of the media content is in the appropriate format for being displayed on the requesting device 115. If the media content is already in the appropriate format, the cache server 201 can simply provide the cached copy to the requesting device 115. If on the other hand, the media file is not in the correct format to be displayed on the requesting device 115, the cache server 201 can provide the media content to the transcoding service 202 having a transcoding engine 207 to perform dynamic transcoding of the media content 208. In accordance with an embodiment, the transcoding service 202 can utilize a graphics processing unit (GPU) configuration to transcode the media content 208 in an optimal performance manner. For example, the transcoding service 202 can use the compute unified device architecture (CUDA) as the computing engine in the GPU to encode the video content into the appropriate format for the requesting device. It should be noted that as previously mentioned, the term "transcoding" is not necessarily limited to changing the format of the media content, but may also include performing such functions as transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. For example, if a requesting device is not able to handle a certain quality video stream, or a certain data transfer rate, the transcoding service 202 may adjust the quality of the video stream or the data transfer rate to accommodate the device.

In accordance with an embodiment, the transcoding service 202 can transcode the media content 208 on-the-fly into the correct encoding format when responding to the request by transmitting bits of the media content to device 115. For example, the POP 205 can stream the bits that have been encoded into the proper format to the device, while the transcoding engine 207 is transcoding the remaining bits of the media content. In accordance with one embodiment, the POP 119 can utilize an initial burst mode to stream the beginning portion of the media content transcoded at one bit rate and then complete the remaining portion of the media content at a different bit rate. Alternatively, the POP 205 can utilize more compute instances to transcode the first portion of the media content at a faster rate during the burst mode and subsequently reduce the number of compute instances. This can help avoid any latency on the part of the requesting device that may be viewing the media content as it is being transcoded and streamed to it.

In accordance with an embodiment, if the transcoding service 202 detects that the requesting device 115 has ceased downloading the media, the dynamic transcoding can be terminated in order to save the computing resources of the POP 205. For example, if the user stops viewing the video file, the transcoding service can halt the transcoding process and apply the GPU resource to other transcoding jobs that may be needed.

Figure 3:
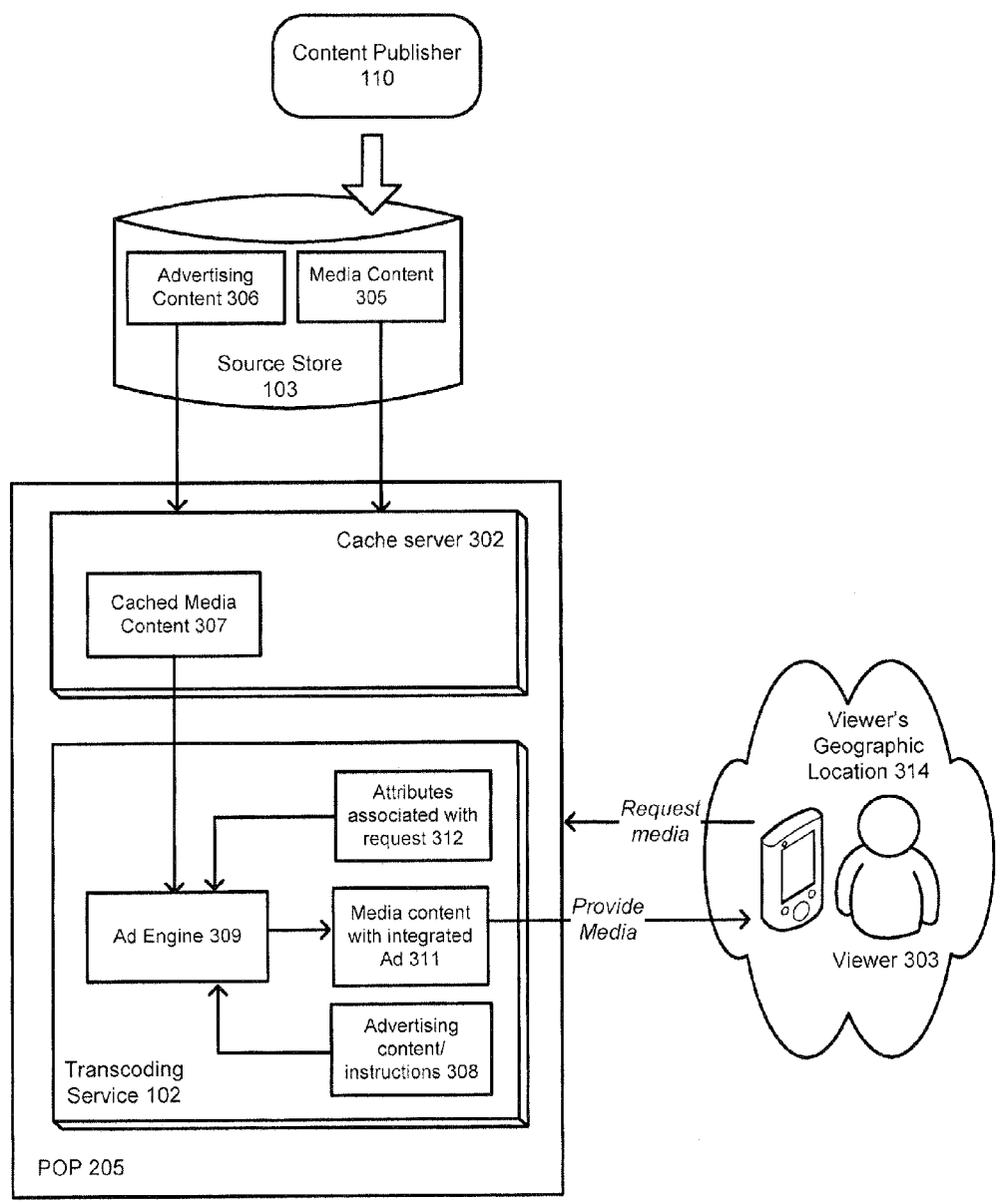
FIG. 3 is an example illustration of inserting personalized advertisements and other content into media assets, in accordance with various embodiments.

FIG. 3 is an example illustration of inserting personalized advertisements and other content into media assets, in accordance with various embodiments.

As illustrated, a content publisher 304 can provide media content 305 to a source store 103 or some other storage location. In one embodiment, the storage location can be any data store, file directory or other input container residing on the servers of the service provider. In other embodiments, the input store 103 may reside on other systems, such as the content publisher's systems. In addition to uploading the file, the content publisher 110 can provide a set of advertisements 306 or other content to be used with the media asset. This advertising content can be uploaded together with the media content or separately, such as by implementing a separate graphical interface for managing ad content.

In accordance with an embodiment, once the media content 305 has been received by the service provider, a copy of the media content 307 can optionally be cached at a cache server 302 residing at the content delivery network (CDN) point-of-presence (POP) 205. For example, when the media content is requested and delivered to an end user by way of the CDN POP 205, it can be cached there locally for future requests. Alternatively, the content can be cached automatically after it has been received from the publisher 110.

In accordance with the illustrated embodiment, the transcoding service 102 can be provided with the media content and a set of advertisement instructions 308 that specify how to insert ads or other personalized content into the media content. For example, the advertising instructions 308 may specify that the ad engine 309 should place an ad for a particular product in a particular media file. In accordance with the illustrated embodiment, the ad engine 309 is part of the transcoding service 102. In alternative embodiments, however, the ad engine may be a separate service or component residing at the network edge such as the POP 205.

In accordance with an embodiment, when the CDN POP 205 receives a request for the media content from a viewer 303, it can first inspect the various attributes associated with the request 312 in order to determine information for the user or the user's device that was used to submit the request. For example, the POP 205 can determine the geographic location 314 of the viewer, the bandwidth of the connection between the viewer and the CDN, the processing capacity of the viewer's device and the like. In accordance with an embodiment, the POP 205 can utilize this information to generate a personalized advertisement or other set of content to be injected into the media content at the time of delivering the content to the viewer 303.

In accordance with an embodiment, the POP includes one or more cache servers 302 and one or more transcoding servers that execute the transcoding service. The cache server may store cached copies of the media content that will be delivered via the POP. The transcoding servers can perform the transcoding of the media content from one format into another, for delivery to the viewer's device. In alternative embodiments, the transcoding service may instead run on the cache server or any other server residing at the network edge.

In accordance with an embodiment, the transcoding service 102 can insert the personalized content into the media content at the time of transcoding the media content into the encoding format appropriate for the viewer's device. As such, in this embodiment, the ad instructions 308 can be provided the transcoding service 102. Inserting the personalized content while transcoding the media can provide multiple advantages, such as the ability to insert the content natively in the format of the media file that will be delivered, so that the advertisement (or other content) appears as it is part of the actual media content itself. For example, a personalized logo or ad can appear in the video as though the video was originally created with the content. Moreover, the ad can be altered depending on the attribute of the request. For example, if the geographic location indicates that the request originated in France, the personalized advertisement can be rendered in French, or the default subtitles for the video can be set to French, or the writings on the product being advertised in the video can be changed to French, or the like. Many other such permutations of using the request attributes to create personalized content and insert it into the media are possible within the scope of the various embodiments.

In accordance with an embodiment, at the time of transcoding the media content, the ad engine can integrate the personalized content into the media content and the media content with the embedded personalized advertisement 311 can be provided to the viewer 303. In one embodiment, the POP 205 can stream the bits of the transcoded media content 311 to the end user while the transcoding and personalizing are being completed. In this case, the portions of the media that have been encoded with the personalized content are being transmitted to the client while the remaining portions of the media are being transcoded and the personalized content applied.

It should be noted that although FIG. 3 depicts the ad engine being located on the transcoding server 310, this is not necessary for all embodiments described throughout this disclosure. In accordance with an alternative embodiment, the insertion of ads (and other personalized content) can be performed by a separate advertising server. Furthermore, the cache server, transcoding server and potential ad server can be separate physical servers or alternatively can be implemented as virtual servers that reside on the same physical machine or multiple physical machines. It will be evident to one of ordinary skill in the art that all such deployment possibilities can be utilized within the scope of the various embodiments described herein. It is further noted that the term "transcoding" as used throughout this disclosure is not limited to changing the format of media but may also include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner.

Figure 4:
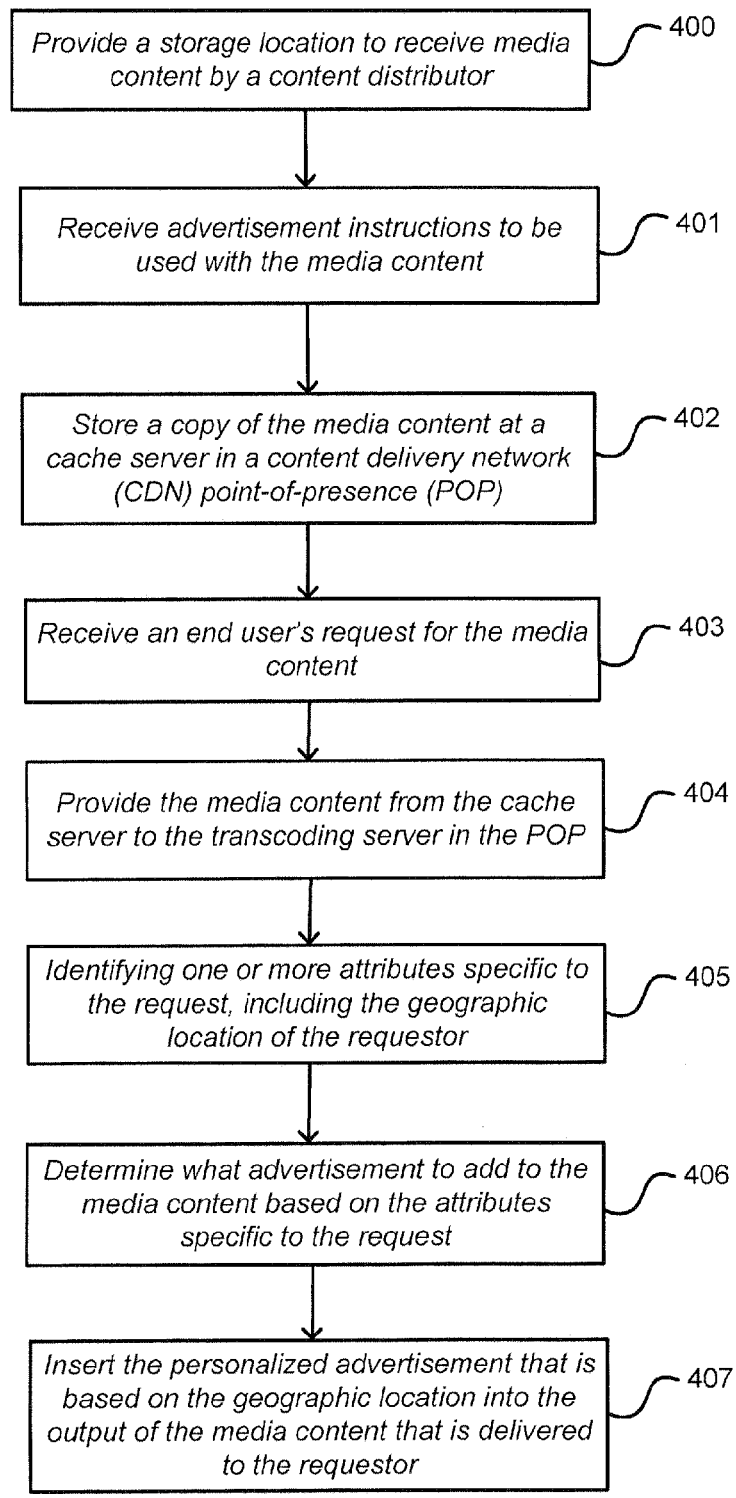
FIG. 4 illustrates an example process for personalized content insertion into media assets, in accordance with various embodiments.

FIG. 4 illustrates an example process for personalized content insertion into media assets, in accordance with various embodiments. Although this figure, as well as any other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

As shown in step 400, the service provider may make available a storage location on its computing resources to allow content publishers to provide (e.g. upload) media assets thereon. The storage location can be an online directory, data store or other input location where the service provider can receive media content (e.g. audio or video file) from the content creator or publisher.

In step 401, the service provider can receive a set of advertisement instructions to be used in conjunction with the media content. The advertisement instructions may specify what form of advertisement or other personalized content is to be served with the media and the locations in the media content where that personalized content should be inserted.

In step 402, the media content can optionally be stored at a cache server located at the CDN POP. In accordance with an embodiment, the media content can be transferred to the cache server at the POP in response to a user's request for the media content. Alternatively, the media content can be transferred automatically, or uploaded to the POP by the content publisher to begin with.

In step 403, the CDN POP receives a user's request to access the media content. For example, the user may request to download and view a video uploaded by the content publisher. In one embodiment, the user may be accessing the media on a mobile device such as a smartphone.

In step 404, the media content is provided from the cache server to a transcoding service located at the POP. In accordance with an embodiment, the transcoding service is responsible for transcoding the media content for the requesting viewer's device.

In step 405, the POP identifies one or more attributes which are specific to the request. As mentioned previously, these attributes may include the user's geographic location, connection bandwidth, processing capacity of the device, user's personal information such as purchasing habits, and the like.

In step 406, the CDN POP can determine and personalize an advertisement to add to the media asset based on the attributes of the request. For example, the POP may determine the user's geographic location and place an advertisement for a business or service located near that location. Alternatively, the POP may determine that the user's device is an iPhone® and place an advertisement for an application for the iPhone® and the like.

In step 407, the transcoding server integrates the personalized ad (or other content) into the media content while transcoding the media content for the user's device. In accordance with an embodiment, this allows the transcoding service to insert ads and content into the media natively at any given key frame or other location in the media. In addition, the advertisement can be personalized based on the content of the video itself. For example, if the server determines that the video is about Hawaii, the ad may advertise vacations to Hawaii or the like.

Figure 5:
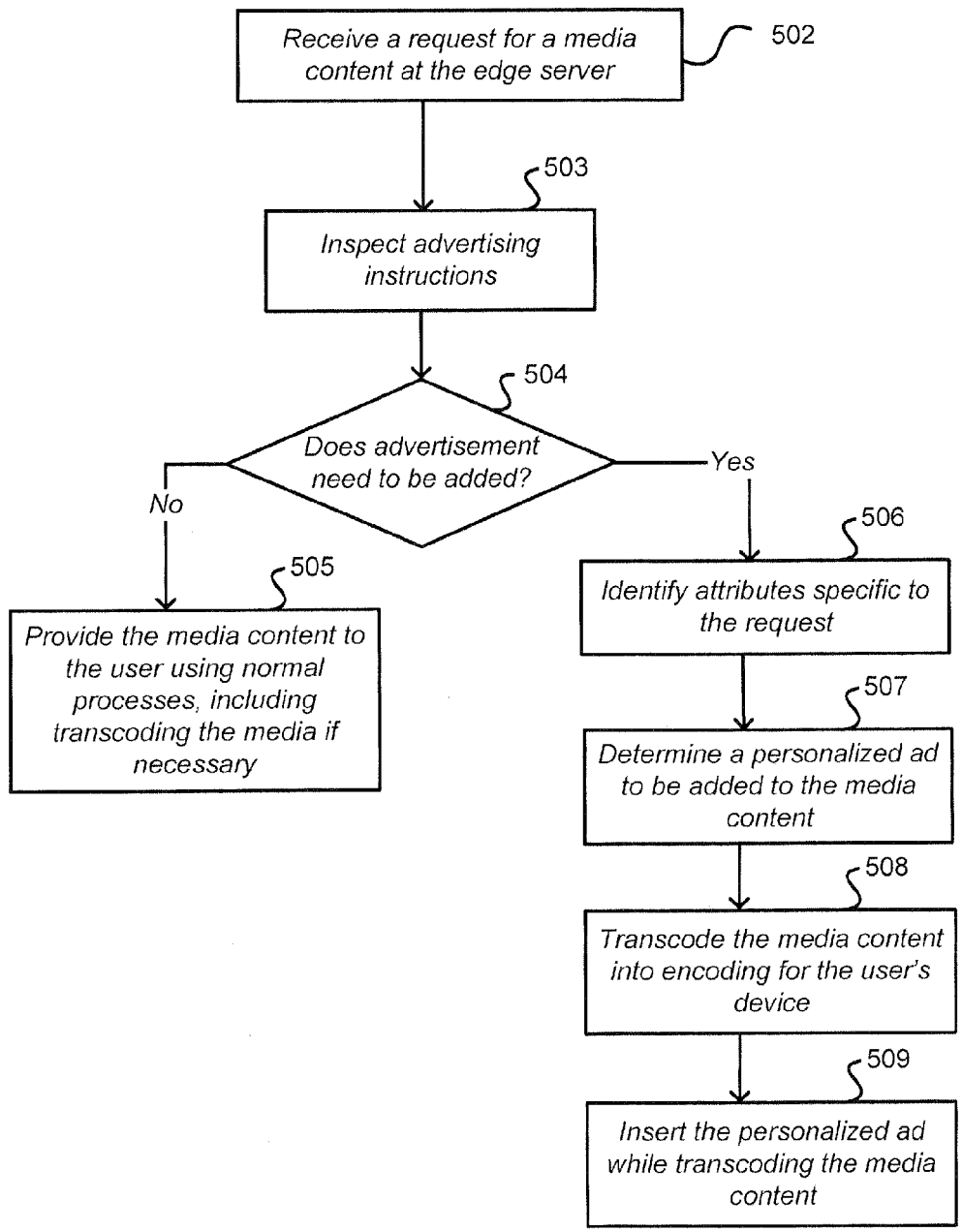
FIG. 5 is an example logical process diagram of personalized content insertion to media assets at the network edge, in accordance with various embodiments.

FIG. 5 is an example logical process diagram of personalized content insertion to media assets at the network edge, in accordance with various embodiments. As illustrated in step 502, the POP receives a request for the media content and performs a number of steps in response thereto. In step 503, the POP can inspect the advertising instructions supplied by the content publisher and determine whether an advertisement should be inserted into the media content (step 504). If no advertisements need to be inserted, the POP can simply provide the user with the media content using normal processes, as shown in step 505. In accordance with an embodiment, this may include transcoding the media content before delivering it to the user's device.

If an advertisement or other personalized content needs to be added to the media content, the POP server can identify information specific to the incoming request (e.g. user's geographic location, etc.) (step 506) and create a personalized advertisement (step 507) to be added to the media based on that information. In step 508, a server at the CDN POP transcodes the media content to the encoding format appropriate for the user's device. In accordance with an embodiment, while transcoding the media asset, the POP can insert the personalized advertisement (or other content) into the media content, in the native format of the media content. In some embodiments, the adding of the personalized content can be performed while the media content is being streamed to the end user in response to the request.

Figure 6:
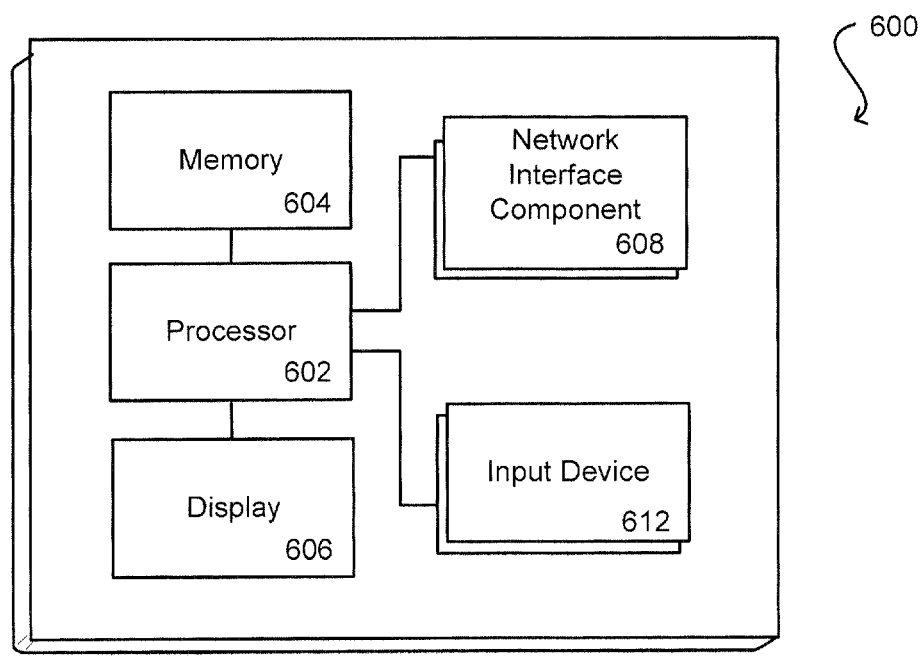
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for inserting personalized content into media, said method comprising:
   receiving media content from a publisher to a storage location of a service provider;
   caching a copy of the media content at a cache server located at a content delivery network (CDN) point-of-presence (POP) of a plurality of POPs using identical internet protocol (IP) addresses, the POP of the plurality of POPs requiring the fewest amount of network hops required to reach a user;
   receiving a request for the media content from the user to the CDN POP;
   providing the media content from the cache server to a transcoding server located at the CDN POP;
   identifying one or more attributes specific to the request, the one or more attributes including a bandwidth of a connection associated with the user and at least one of a geographic location information associated with the user that initiated the request, a language associated with the user, or the user's purchasing habits;
   determining at least one personalized advertisement to add to the media content based on the one or more attributes specific to the request; and
   integrating interleaving bits of the at least one personalized advertisement with bits of the media content, the personalized advertisement based at least in part on the geographic location identified in the one or more attributes of the request, the bits of the personalized advertisement integrated into interleaved with the bits of the media content during a process of transcoding the media content from a first media encoding format into a second media encoding format, such that the media content in the second media encoding format includes and the personalized advertisement in the second media encoding format are capable of being rendered synchronously on a computing device of the user.

2. The method of claim 1, wherein integrating the personalized advertisement further comprises:
   selecting at least one key frame of the media content; and
   inserting the personalized advertisement at the selected key frame of the media content.

3. The method of claim 1, further comprising:
   receiving, from the publisher, a set of advertisement instructions that indicate which personalized advertisements should be inserted into the media content and indicate at least one location in the media content where the personalized advertisement should be rendered.

4. The method of claim 1, wherein integrating the personalized advertisement further comprises:
   inserting the personalized advertisement into the media content while transcoding the media content from a first encoding format into a second encoding format.

5. A computer implemented method, comprising:
   storing media content at a network edge server of a plurality of network edge servers using identical internet protocol (IP) addresses, the network edge server of the plurality of network edge servers requiring the fewest amount of network hops required to reach a user;
   receiving a request for the media content from the user to the network edge server;

identifying, at the network edge server, information associated with the request, the information including at least a bandwidth of a connection associated with the user;

creating a set of personalized content to be inserted into the media content based on the information associated with the request;

incorporating bit-interleaving the set of personalized content into the media content at the network edge server, the set of personalized content incorporated bit-interleaved into the media content at a time of transcoding the media content from a first format into a second format such that the set of personalized content and the media content are capable of being rendered synchronously on a computing device of the user; and providing the media content containing the set of personalized content to the end user in response to the request.

6. The method of claim 5, wherein the information associated with the request further includes geographic location information of the user that initiated the request.

7. The method of claim 5, wherein the set of personalized content is incorporated into the media content while transcoding the media content into a native encoding format of the end user's device, wherein the set of personalized content is incorporated into the media content in the native format.

8. The method of claim 5, further comprising:
selecting at least one key frame of the media content; and
inserting the set of personalized content at the selected key frame of the media content.

9. The method of claim 5, wherein the information associated with the request further includes at least one of: a language associated with the user and the user's purchasing habits.

10. The method of claim 5, further comprising:
receiving, from a content publisher, a set of advertisement instructions that indicate which personalized advertisements should be inserted into the media content and indicate at least one location in the media content where the personalized advertisement should be rendered.

11. A computing system, comprising:
at least one processor; and
memory including instructions that, when executed by the processor, cause the computing system to:
storing media content at a network edge server of a plurality of network edge servers using identical internet protocol (IP) addresses, the network edge server of the plurality of network edge servers requiring the fewest amount of network hops required to reach a user;
receiving a request from the user to the network edge server, requesting access to the media content;
identifying, at the network edge server, a set of attributes associated with the request or with the user that initiated the request, wherein the set of attributes includes at least a bandwidth of a connection associated with the user;
determining a set of personalized content to be inserted into the media content based on the set of attributes associated with the request;
incorporating bit-interleaving the set of personalized content into the media content while encoding the media content at the network edge server, the set of personalized content incorporated bit-interleaved into the media content at a time of transcoding the media content from a first format into a second format such that the set of personalized content and the media content are capable of being rendered synchronously on a computing device of the user; and providing the media content containing the set of personalized content to the end user in response to the request.

12. The computing system of claim 11, wherein the set of attributes associated with the request further includes geographic location information of the user that initiated the request.

13. The computing system of claim 11, wherein the set of personalized content is incorporated into the media content while transcoding the media content into a native encoding format of the end user's device, wherein the set of personalized content is incorporated into the media content in the native format.

14. The computing system of claim 11, further comprising instructions for:
selecting at least one key frame of the media content; and
inserting the set of personalized content at the selected key frame of the media content.

15. The computing system of claim 11, wherein the set of attributes associated with the request further includes at least one of: a language associated with the user and the user's purchasing habits.

16. The computing system of claim 11, further comprising instructions for:
receiving, from a content publisher, a set of advertisement instructions that indicate which personalized advertisements should be inserted into the media content and indicate at least one location in the media content where the personalized advertisement should be rendered.

17. A non-transitory computer readable storage medium storing one or more sequences of instructions executable by one or more processors to perform a set of steps comprising:
storing media content locally at a content delivery network (CDN) point-of-presence (POP) of a plurality of POPs using identical internet protocol (IP) addresses, the POP of the plurality of POPs requiring the fewest amount of network hops required to reach a user;
receiving a request from the user to the CDN POP, requesting access to the media content;
determining, at the CDN POP, a set of attributes associated with the request or with the user that initiated the request, wherein the set of attributes includes at least a bandwidth of a connection associated with the user;
generating a set of personalized content to be inserted into the media content based on the set of attributes associated with the request;
incorporating bit-interleaving the set of personalized content into the media content while encoding the media content at the CDN POP, the set of personalized content incorporated bit-interleaved into the media content at a time of transcoding the media content from a first format into a second format such that the set of personalized content and the media content are capable of being rendered synchronously on a computing device of the user; and
providing the media content containing the set of personalized content to the end user in response to the request.

18. The non-transitory computer readable storage medium of claim 17, wherein the set of attributes associated with the request further includes geographic location information of the user that initiated the request.

19. The non-transitory computer readable storage medium of claim 17, wherein the set of personalized content is incorporated into the media content while transcoding the media content into a native encoding format of the end user's device, wherein the set of personalized content is incorporated into the media content in the native format.

20. The non-transitory computer readable storage medium of claim 17, further comprising instructions for:
   selecting at least one key frame of the media content; and
   inserting the set of personalized content at the selected key frame of the media content.

21. The non-transitory computer readable storage medium of claim 17, wherein the set of attributes associated with the request further includes at least one of: a language associated with the user and the user's purchasing habits.

22. The non-transitory computer readable storage medium of claim 17, further comprising instructions for:
   receiving, from a content publisher, a set of advertisement instructions that indicate which personalized advertisements should be inserted into the media content and indicate at least one location in the media content where the personalized advertisement should be rendered.

* * * * *